(12) United States Patent
Ochsenkühn et al.

(10) Patent No.: US 11,999,101 B2
(45) Date of Patent: Jun. 4, 2024

(54) PLASTIC-BASED MATERIALS FOR PROCESSING BY MEANS OF ADDITIVE MANUFACTURING

(71) Applicant: Siemens Mobility GmbH, Munich (DE)

(72) Inventors: Manfred Ochsenkühn, Berg (DE); Heinrich Zeininger, Obermichelbach (DE); Maximilian Kunkel, Herzogenaurach (DE)

(73) Assignee: SIEMENS MOBILITY GMBH, Bayern (DE)

( * ) Notice: Subject to any disclaimer, the term of this patent is extended or adjusted under 35 U.S.C. 154(b) by 1584 days.

(21) Appl. No.: 16/305,543

(22) PCT Filed: May 23, 2017

(86) PCT No.: PCT/EP2017/062385
§ 371 (c)(1),
(2) Date: Nov. 29, 2018

(87) PCT Pub. No.: WO2017/207342
PCT Pub. Date: Dec. 7, 2017

(65) Prior Publication Data
US 2021/0221049 A1    Jul. 22, 2021

(30) Foreign Application Priority Data

Jun. 2, 2016   (DE) .................... 10 2016 209 719.9

(51) Int. Cl.
| | |
|---|---|
| B29C 64/153 | (2017.01) |
| B33Y 10/00 | (2015.01) |
| B33Y 70/00 | (2020.01) |
| B33Y 70/10 | (2020.01) |
| C08L 79/08 | (2006.01) |
| C08L 81/04 | (2006.01) |

(52) U.S. Cl.
CPC ............ B29C 64/153 (2017.08); B33Y 10/00 (2014.12); B33Y 70/00 (2014.12); B33Y 70/10 (2020.01); C08L 79/08 (2013.01); C08L 81/04 (2013.01); *C08L 2201/02* (2013.01); *C08L 2207/04* (2013.01)

(58) Field of Classification Search
CPC .... B29C 70/34; B29C 64/153; C08J 2381/04; C08J 2379/08; C08G 2650/40; C08G 73/1046
See application file for complete search history.

(56) References Cited

U.S. PATENT DOCUMENTS

| | | | | |
|---|---|---|---|---|
| 5,380,805 | A | * 1/1995 | Tamai ............... | C08G 73/1042 525/420 |
| 2007/0066765 | A1* | 3/2007 | Aneja .................... | C08L 79/08 525/437 |
| 2009/0017220 | A1 | 1/2009 | Muller et al. ................. | 427/493 |
| 2009/0295042 | A1 | 12/2009 | Pfister et al. ................. | 264/497 |
| 2014/0050921 | A1* | 2/2014 | Lyons .................... | B22F 12/30 428/401 |
| 2015/0145168 | A1 | 5/2015 | Rodgers et al. ............. | 264/308 |
| 2015/0252190 | A1 | 9/2015 | Rodgers et al. ............. | 524/592 |
| 2015/0259530 | A1 | 9/2015 | Rodgers et al. ............. | 524/538 |
| 2016/0215092 | A1 | 7/2016 | Vanelli et al. ................ | 524/570 |

FOREIGN PATENT DOCUMENTS

| | | | | |
|---|---|---|---|---|
| CN | 104231607 | * 12/2014 | | |
| JP | 63312355 A | 12/1988 | ............. | C08L 79/08 |
| RU | 2469851 C2 | 12/2012 | ............. | B29C 35/08 |
| RU | 2498901 C2 | 11/2013 | ............. | B29C 35/08 |
| RU | 2014125188 A | 2/2016 | ............. | C08G 69/26 |
| WO | 2009/009525 A1 | 1/2009 | ............. | C08L 79/08 |
| WO | 2017/207342 A1 | 12/2017 | ........... | B29C 64/153 |

OTHER PUBLICATIONS

Wu et al Study on Thermal Properties and Crystallization Behavior of Blends of Poly(phenylene sulfide)/Poly(ether imide), Polymer-Plastics Technology and Engineering, 49: 1506-1514, 2010, published on May 2010.*
Russian Office Action, Application No. 2018146069/05, 5 pages, dated Nov. 6, 2019.
Russian Office Action, Application No. 2018146069/05, 9 pages, dated May 28, 2019.
German Office Action, Application No. 10 2016 209 719.9, 8 pages, dated Mar. 9, 2017.
International Search Report and Written Opinion, Application No. PCT/EP2017/062385, 21 pages, dated Sep. 5, 2017.
European Office Action, Application No. 17727154.1, 12 pages, dated Jun. 24, 2022.

* cited by examiner

*Primary Examiner* — Gregory Listvoyb
(74) *Attorney, Agent, or Firm* — Slayden Grubert Beard PLLC

(57) ABSTRACT

Various embodiments may include a powder for processing in an SLS method comprising a blend of a first material and a second material. The first material comprises at least one of an amorphous high temperature-resistant thermoplastic or a liquid-crystalline polymer and the second material comprises a semicrystalline material. The blend exhibits a crystallization melting point.

8 Claims, 2 Drawing Sheets

PLASTIC-BASED MATERIALS FOR PROCESSING BY MEANS OF ADDITIVE MANUFACTURING

CROSS-REFERENCE TO RELATED APPLICATIONS

This application is a U.S. National Stage Application of International Application No. PCT/EP2017/062385 filed May 23, 2017, which designates the United States of America, and claims priority to DE Application No. 10 2016 209 719.9 filed Jun. 2, 2016, the contents of which are hereby incorporated by reference in their entirety.

TECHNICAL FIELD

The present disclosure relates to additive manufacturing. Various embodiments may include a material for processing by generative manufacturing methods, in particular by processing in the SLS process.

BACKGROUND

Selective laser sintering (SLS) is a powder- and beam-based process in which articles are constructed layerwise in virtually any desired geometry without tools and molds, typically using plastic materials. Compared to the FDM method (fused deposition modelling) in which a workpiece is constructed layerwise from a meltable plastic, the surface quality and the z-(directional-) dependence of the mechanical properties are better in SLS. Workpieces produced by SLS generally show a less pronounced anisotropy of mechanical properties.

In the method of selective laser sintering SLS, products having a very wide variety of properties are produced by layerwise local melting with selective laser radiation of pulverulent layers of materials developed specifically for this method. Compared to other additively processed plastics, laser sintered component parts exhibit not only very high mechanical and/or chemical resilience but also a very high heat resistance. The SLS method is characterized in particular by the temperature difference between the crystallite melting temperature and the crystallization temperature of the semicrystalline plastics. The temperature window between the two recited temperatures defines the melting and solidification process and thus the heating and cooling phase.

Plastics that have hitherto been processed in the SLS method include semicrystalline polyamides, polyaryletherketones and urethane-based polymers. These plastics may be used in the SLS method to produce component parts which, especially for application for component parts in the electricals/electronics sector (E&E), as yet provide insufficient flame retardancy. There is therefore as yet a lack of applications of the SLS method in the production of component parts for the E&E sector.

SUMMARY

The teachings of the present disclosure include a plastic material for processing in the SLS method which provides not only a tracking resistance sufficient for use in the E&E sector but also flame retardancy, in particular intrinsic flame retardancy. For example, some embodiments include a blend of at least one amorphous high temperature-resistant thermoplastic and/or a liquid crystalline polymer such as PEI, PEEK and/or PPS with at least one semicrystalline material such as polyphenylene sulfide (PPS), characterized in that the blend exhibits not only the glass transition temperature but also at least one crystallization melting point, so that additive manufacturing by SLS is realizable with the blend.

As another example, some embodiments include a powder for processing in an SLS method comprising a blend of at least one amorphous high temperature-resistant thermoplastic and/or a liquid-crystalline polymer such as PEI, PES, PPSU, PEEK and/or PPS with at least one semicrystalline material such as polyphenylene sulfide, characterized in that the blend exhibits not only the glass transition temperature but also at least one crystallization melting point, so that additive manufacturing by SLS is realizable with the blend.

In some embodiments, there is a blend of the amorphous thermoplastic with the semicrystalline polymeric material in a ratio of 0.5 parts of amorphous thermoplastic:1.5 parts of the semicrystalline polymeric material to 1.5 parts of amorphous thermoplastic:0.5 parts of semicrystalline polymeric material.

In some embodiments, there is a blend in which the glass transition temperature of the amorphous thermoplastic and the crystallite melting point of the semicrystalline polymeric material are no more than 25° C., in particular from 5° C. to 20° C., apart.

In some embodiments, there is a blend of PEI and PPS. In some embodiments, there is a blend of PEI and PPS in a ratio of 0.8:1.2.

In some embodiments, there is a blend of a semicrystalline polyamide, polyaryletherketone and/or urethane-based polymers with an amorphous intrinsically flame retardant polymer.

As another example, some embodiments include a component part for use in the electricals/electronics sector having sufficient flame retardancy and producible in the SLS method using a powder as described above.

DETAILED DESCRIPTION

In the present disclosure, the terms "blend" or "polyblend" are used to describe mixtures of two or more different polymers. The properties of the thus formed plastics differ from those of the original polymers. It is nevertheless predominantly a purely physical mixture without formation of new chemical bonds as are required in copolymers for instance.

Figure 1:
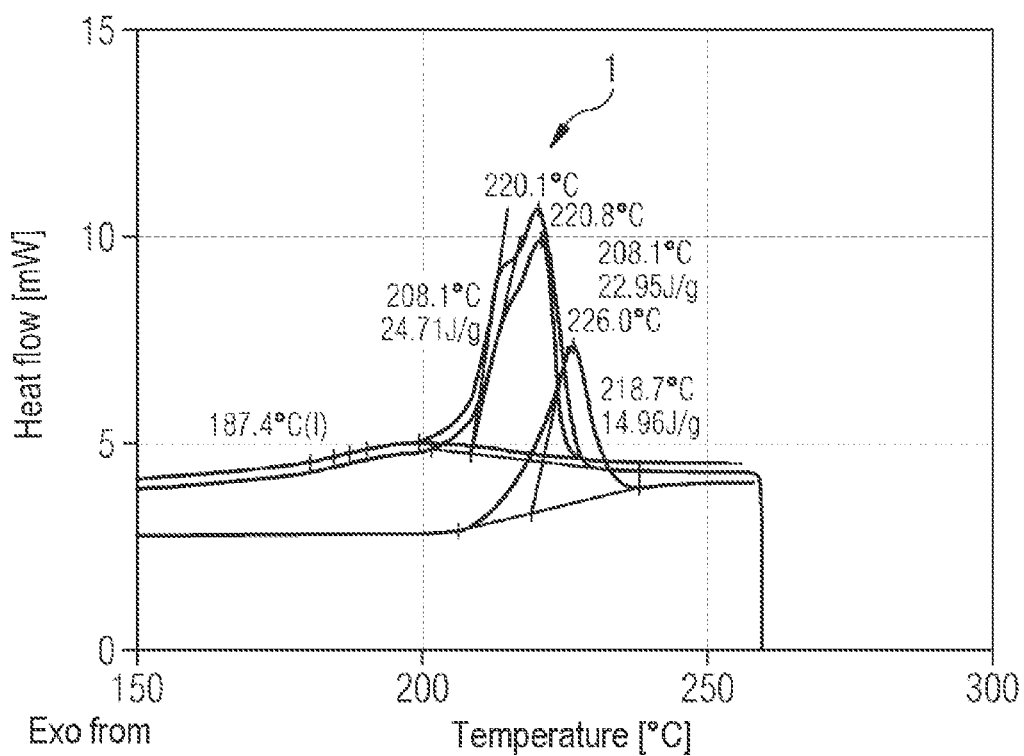
FIG. 1 shows the reaction kinetics of a blend according to an example embodiment incorporating teachings of the present disclosure and with a ratio of PEI to PA of approximately 1:1.

In some embodiments of the teachings herein, the crystallization melting point of the semicrystalline constituents is in a similar temperature range to the glass transition point of the amorphous constituents of the blend. For example the glass transition point of the blend is no more than 25° C. apart from the crystallization melting point of the blend. FIG. 1 shows the reaction kinetics of a blend according to example 1 with a ratio of PEI to PA of approximately 1:1. the two temperatures are in a temperature difference range of 5° C. to 20° C. In some embodiments, the two temperatures, i.e. the glass transition temperature of the blend on the one hand and the crystallite melting temperature on the other hand, are up to 100° C. apart. In particular cases this can result in particularly intrinsically flame retardant and also tracking-resistant component parts.

In some embodiments, the first component, the amorphous thermoplastic, and the second component, the semicrystalline polymeric material, are present in the blend in a ratio of 0.5 parts of amorphous thermoplastic: 1.5 parts of the semicrystalline polymeric material to 1.5 parts of amorphous thermoplastic: 0.5 parts of semicrystalline polymeric material. For example the two components may be present in the blend in a ratio of 1:1 or 0.8:1.2 or 0.9:1.1.

In some embodiments, the powder comprises a blend in which the glass transition temperature of the amorphous thermoplastic and the crystallite melting point of the semicrystalline polymeric material are no more than 25° C., in particular from 5° C. to 20° C., apart. In some embodiments, a blend is used to manufacture a component part for use in the electricals/electronics sector having sufficient flame retardancy which is producible in the SLS method using a powder comprising a blend according to the invention.

Suitable amorphous plastics, in particular high-temperature plastics such as PEI (polyetherimide), PES (polyethersulfone), PPSU (polyphenylsulfone), PSU (polysulfone) feature intrinsic flame retardancy and are generally characterized by a glass transition temperature. By contrast, the semicrystalline polyphenylene sulfide systems such as the polyphenylene sulfide-based commercial material primarily used to date in the SLS method provide insufficient flame retardancy. The SLS method is characterized in particular by the temperature difference between the crystallite melting temperature and the crystallization temperature of the semicrystalline plastics. The temperature window between the two recited temperatures defines the melting and solidification process and thus the heating and cooling phases.

The production of plastics blends from amorphous high temperature materials such as for example PEI with semicrystalline materials, in particular polyphenylene sulfide, makes it possible to utilize the properties of both plastics components. The engineering of the glass transition temperature and the crystallite and/or crystallization temperature make processing by the SLS method possible.

In addition to the locally limited sintering of the plastics particles of the semicrystalline component, blend production makes it possible through choice of the amorphous component and the glass transition temperature thereof to utilize an additional method parameter for the heating and cooling process of the SLS method to improve properties, in particular to increase flame retardancy. Use of for example PEI in the blend increases the flame retardancy thereof while the use of for example PA6 increases the CTI value (tracking resistance).

The teachings herein are more particularly elucidated hereinbelow with reference to selected working examples:

Example 1

A plastics blend of PEI and PA in an approximately equal ratio was produced. The blend resulted in the characteristics shown in FIG. 1. FIG. 1 shows the reaction kinetics of a blend according to example 1 with a ratio of PEI to PA of approximately 1:1. In the graphic the Y axis shows the heat flow in milliwatts and the X axis shows the temperature in ° C.

The melting peak of semicrystalline PA at 220° C. overlaps with the glass transition of PEI at about 217° C. The glass transition of the PEI becomes apparent again in the pronounced shoulder 1 in this temperature range. During the SLS method the laser heats the powder of the plastics blend to above the melting point of the semicrystalline component.

In the processing of the blend from example 1 in the SLS method the glass transition temperature of the PEI overlaps with crystallite melting temperature of the PA in the range between about 217° C. and 220° C. The plastics blend particles are fused to one another and to the preceding layer in the temperature range of about 230° C. to 270° C., for example at about 260° C. The non-molten powder supports the melt generated even from temperatures of below 217° C. When choosing the PA it is preferable to use a component whose recrystallization takes place above 190° C.

Figure 2:
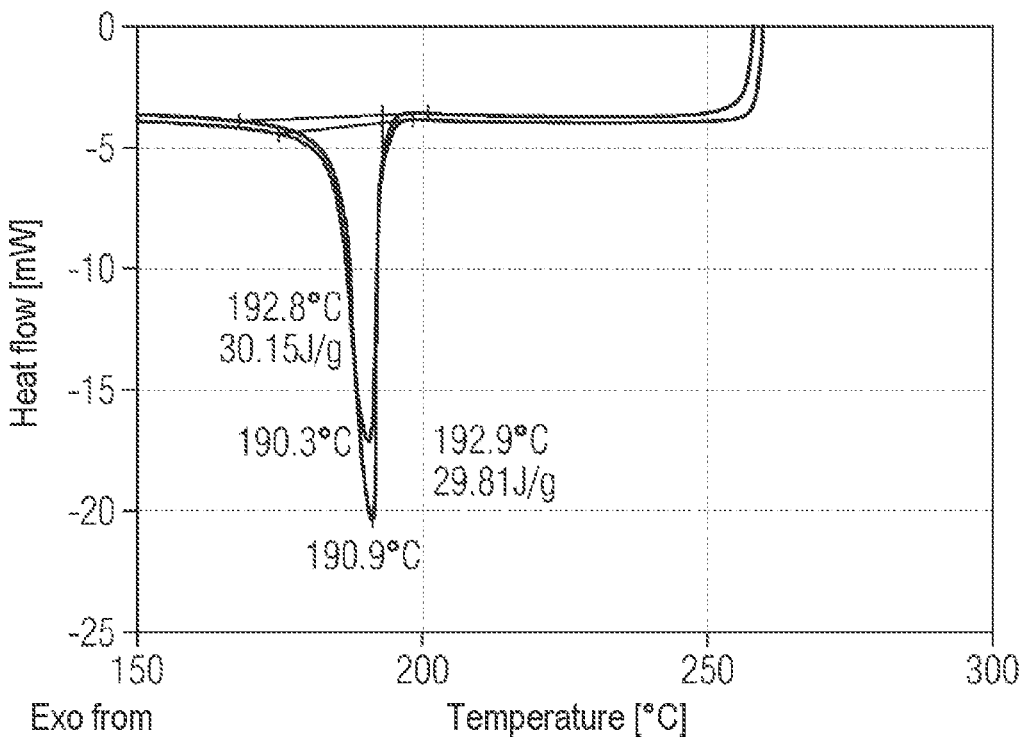
FIG. 2 shows reaction kinetics for the blend according to example 1 of PEI and PA in a ratio of 1:1 during the recrystallization.

At the recrystallization temperature of the PA of 190° C. the PEI is in the solid state. The blend according to example 1 of PEI and PA in a ratio of 1:1 results in the reaction kinetics shown in FIG. 2 during the recrystallization. The blend according to example 1—as shown in FIG. 2—provides a broad transition from the melt to the solid state which upon suitable temperature management in the SLS method may be utilized in the construction space to relieve stresses. In a blend produced according to example 1 the crystallization kinetics compared to pure semicrystalline plastics may be influenced.

Example 2

Figure 3:
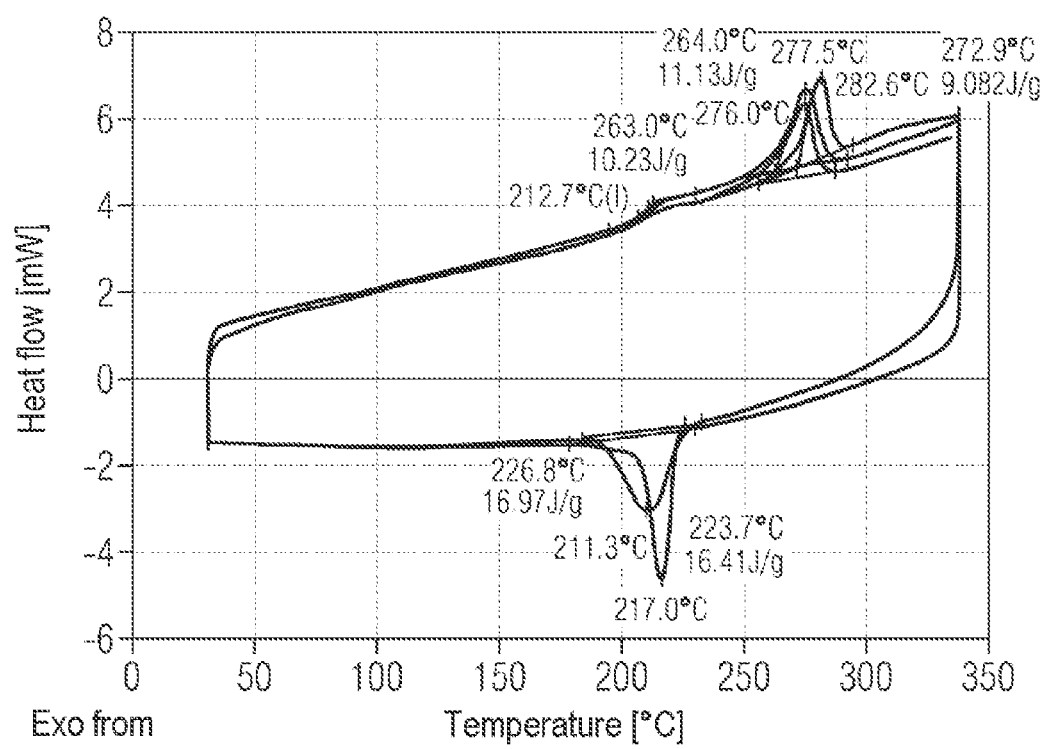
FIG. 3 shows the reaction kinetics of a blend according to another example embodiment incorporating the teachings herein and having a ratio of PEI to PPS of approximately 1:1.

A plastics blend of PEI and PPS in an approximately equal ratio was produced. The blend resulted in the characteristics shown in FIG. 3. FIG. 3 shows the reaction kinetics of a blend according to example 2 with a ratio of PEI to PPS of approximately 1:1. In the graphic the Y axis shows the heat flow in milliwatts and the X axis shows the temperature in ° C. The melting peak of PPS at 277.5° C. does not overlap with the glass transition of PEI at about 217° C.

In the processing of the two high temperature-stable plastics systems at temperatures above 300° C., for example at 320° C., the two powders fuse with one another. A suitable cooling keeps the environment below the crystallization temperature and/or below the glass transition temperature. The combination of amorphous and semicrystalline plastics proposed in accordance with the teachings herein additionally results in a complementing or combination of the spectrum of properties. In addition to a good dynamic behavior, damping should be improved due to the amorphous state. Abrasion should be reduced by the semicrystalline component and formation of stresses should be improved compared to a pure amorphous plastic. The semicrystalline component guarantees a good flowability and the amorphous component a relatively low shrinkage.

The profile of properties and/or the process parameters may be adapted as required by altering the mixing ratios of the individual components, i.e. the compound composition.

Some embodiments may include a powder for processing in the SLS method where the properties of a semicrystalline polymer compound are combined with those of an amorphous polymer compound. Accordingly, component parts having a flame retardancy sufficient for use in the E&E sector are obtainable by the SLS method for the first time.

What is claimed is:

1. A powder for processing in an SLS method, the powder comprising:
   a blend of a first material and a second material;
   wherein the first material comprises at least one material selected from the group consisting of:
   a polyethersulfone, a polyphenylsulfone, a polyether ether ketone, and a polyphenylene sulfide; and
   the second material comprises a semicrystalline material;
   wherein the blend exhibits a crystallization melting point and a glass transition temperature of the first material and a crystallite melting point of the second material are no more than 25° C. apart.

2. The powder as claimed in claim 1, wherein—the first material is blended with the second material in a ratio falling between of 0.5 parts of the first material: 1.5 parts of the second material to 1.5 parts of the first material: 0.5 parts of the second material.

3. The powder as claimed in claim 1, wherein:
   the second material comprises PPS.

4. The powder as claimed in claim 1, wherein:
   the second material comprises PPS; and
   the first material and the second material are present in a ratio of 0.8:1.2.

5. A powder for processing in an SLS method, the powder comprising:
   a blend of a first material and a second material;
   wherein the first material comprises at least one material selected from the group consisting of: a polyethersulfone, a polyphenylsulfone, a polyether ether ketone, and a polyphenylene sulfide; and
   the second material comprises a semicrystalline material;
   wherein the blend exhibits a crystallization melting point;
   the first material further comprises at least one of a semicrystalline polyamide, a polyaryletherketone, or an urethane-based polymer; and
   the second material further comprises an amorphous intrinsically flame retardant polymer.

6. The powder as claimed in claim 5, wherein—the first material is blended with the second material in a ratio falling between of 0.5 parts of the first material: 1.5 parts of the second material to 1.5 parts of the first material: 0.5 parts of the second material.

7. The powder as claimed in claim 1, wherein the second material comprises PPS.

8. The powder as claimed in claim 1, wherein:
   the second material comprises PPS; and
   the first material and the second material are present in a ratio of 0.8:1.2.

* * * * *